Aug. 17, 1948.                    O. E. WOLFF                    2,447,384
                         TORQUE-TRANSMITTING APPARATUS
Filed Feb. 25, 1944                                          3 Sheets-Sheet 1

Otto E. Wolff
INVENTOR.

BY Donald L. Brown
Attorney

Aug. 17, 1948.　　　　O. E. WOLFF　　　　2,447,384
TORQUE-TRANSMITTING APPARATUS
Filed Feb. 25, 1944　　　　　　　　　　　　3 Sheets-Sheet 3

Otto E. Wolff
INVENTOR.
BY Donald L. Brown
Attorney

Patented Aug. 17, 1948

2,447,384

UNITED STATES PATENT OFFICE 2,447,384

TORQUE-TRANSMITTING APPARATUS

Otto E. Wolff, Chestnut Hill, Mass., assignor of one-fourth to Polaroid Corporation, Cambridge, Mass., a corporation of Delaware Application February 25, 1944, Serial No. 523,960

19 Claims. (Cl. 64—30)

This invention relates to torque-transmitting devices and, more particularly, to novel and improved coupling or clutch means for operatively connecting rotary members.

It is one object of the present invention to provide a coupling for transmitting torques up to a predetermined torque, said coupling embodying novel, readily adjustable means for controlling the maximum transmittable torque.

A further object is to provide a novel coupling for connecting substantially coaxial rotary members, said coupling being capable of self-alignment to compensate for misalignments of said members relative to one another.

Still another object is to provide a novel safety coupling adapted to effect substantially complete and frictionless disengagement between the driving and driven members when a predetermined torque is exceeded.

A still further object is to provide a coupling or clutch of the above character wherein re-engagement of the driven and driving members is automatically obtained by bringing said members to the same rotational speed, as for example, by bringing both members to rest.

Further objects are the provision of a novel clutch or coupling which tends to absorb and eliminate the transmission of shocks and vibrations and to smooth out power fluctuations between the interconnected members, which is simple, compact and reliable in operation and which can be readily and economically manufactured and assembled.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

In the drawings, wherein like reference characters refer to like parts throughout the several views.

Figure 1:
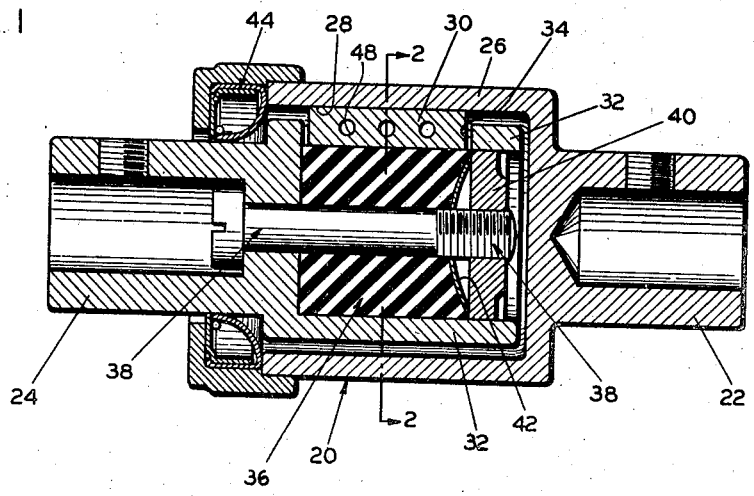
Figure 1 is a sectional view of one type of coupling embodying the present invention, the section being taken substantially along the axis of rotation of said coupling.
Figure 2:
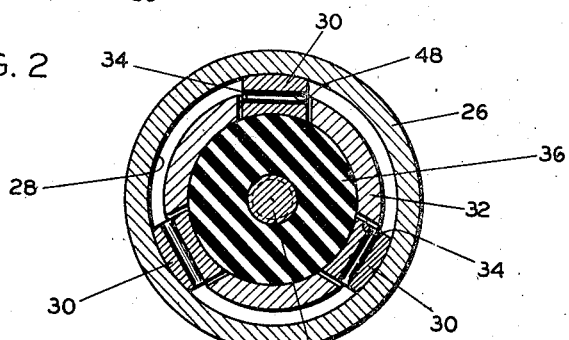
Fig. 2 is a sectional view taken substantially along line 2—2 of Fig. 1 and showing the frictional surfaces of said coupling in driving engagement.
Figure 3:
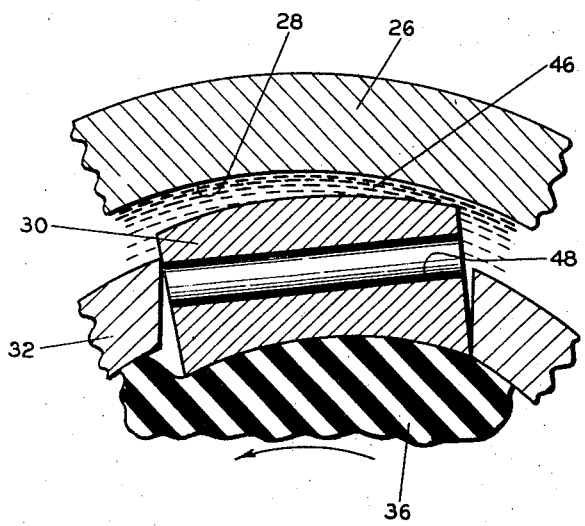
Fig. 3 is an enlarged fragmentary sectional view of a portion of Fig. 2 showing the frictional surfaces of the coupling in disengaged position.

Referring to Figures 1 to 4, the novel power-transmitting device of the present invention is illustrated by way of example in the form of a self-contained, relatively simple and compact unit 20 which may be readily connected to a pair of rotary members to serve as a coupling for said members. As shown, said unit is provided with a pair of substantially coaxial hubs 22 and 24, one of which may be connected to a driving shaft (not shown) and the other to a driven shaft (not shown). Rigidly secured to hub 22, as by being formed therewith, is an open ended housing 26 having a substantially cylindrical internal surface 28 which is adapted to serve as one of the friction surfaces of the coupling. Novel means are provided for operatively mounting a plurality of clutch shoes 30 for frictional engagement with said cylindrical surface and, in the form shown, said means comprise a cage 32 rigidly secured to, or integrally formed with, hub 24 and extending substantially concentrically within housing 26. Cage 32 is provided with a plurality of axial slots or openings 34 (Figs. 2 and 4), preferably three or more in number, said openings being spaced equal distances around the periphery of said cage, and each serving to mount one of clutch shoes 30. The latter preferably have arcuately shaped outer surfaces conforming to the shape of surface 28 so as to make good contact therewith.

In order to urge shoes 30 into operative engagement with surface 28, suitable yieldable means are contained within cage 32, being so mounted as to engage the inner surfaces of said shoes and to exert a substantially radial outward pressure on the latter. In one form of the invention, said means comprise a core 36 of yielding material, such as a rubber, but it is to be understood that any means or material, such for example as a fluid in a flexible container, capable when under compression of transmitting pressure to said shoes to urge the latter into frictional engagement with surfaces 28, may be used instead of core 36. For reasons to appear hereinafter, it is preferable that the yieldable pressure-applying means be formed of oil-resistant material.

To fix core 36 in cage 32 a screw 38 is provided and, as shown, said screw has its head accessible from the exterior of the coupling, and extends through the transverse wall of said cage and through said core. A cylindrical nut 40 which fits within cage 32 is threaded on said screw and is preferably engaged by suitable means, such as a key (not shown) so as to be free for axial movement but held against rotary movement relative to said cage, a suitable spring element 42 being preferably interposed between nut member 40 and the end of core 36. As a result of this arrangement, rotation of said screw varies the axial position of said nut and controls the compressive force applied to core 36, thereby providing a means for adjusting the radial pressure exerted upon shoes 30 tending to press the latter into engagement with surface 28. This arrangement provides a ready means for controlling the maximum torque which can be transmitted by the coupling.

Figure 4:
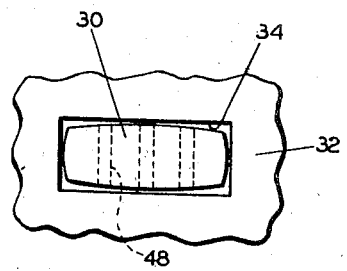
Fig. 4 is a plan view, with parts broken away, showing one of the clutch shoes of the coupling and the mounting therefor.

In order to render unit 20 self-aligning so as to compensate for misalignments of the members coupled together, it is preferable to have shoes 30 fit loosely into the openings 34. As shown in Fig. 4, openings 34 are rectangular in shape whereas the surfaces of said shoes opposite the walls of openings 34 are preferably curved convexly. As a result, said shoes are free for limited circumferential, pivotal and radial movement relative to cage 32 and will, therefore, align themselves for good contact with surface 28, despite any axial misalignments of hub 22 relative to hub 24.

In operation, when the maximum torque which can be transmitted between shoes 30 and surface 28 is exceeded, said shoes will slip on said surface. If said surfaces are unlubricated, re-engagement of the coupling will occur as soon as said torque decreases below the maximum transmittable torque.

It may be desirable, however, to effect substantially complete disengagement between the driving and driven members connected by unit 20 when a predetermined torque is exceeded, the disengagement being such that re-engagement will not occur until there is no relative rotation between said members, as for example, when both are at rest. In order to achieve this result, the space within housing 26 is rendered fluidtight by means of a fluid seal 44 of any conventional type, which is preferably mounted adjacent the open end of said housing and engages hub 24 to give the desired sealing effect. There is then provided within housing 26 a suitable quantity of lubricating medium 46, preferably oil. As a result, when the maximum transmittable torque is exceeded, shoes 30 will begin to slip relative to surface 28 and this slipping action, because of the resilient mounting of said shoes, will cause the latter to tilt somewhat so as to produce a wedge effect between the friction surfaces which are normally in engagement with one another. When this wedge action takes place the lubricating film 46 within housing 26 is forced between said engaging surfaces and, in effect, produces a complete separation of said surfaces, as illustrated in somewhat exaggerated fashion in Fig. 3. Substantially no torque can be transmitted from the driven member to the driving member while this condition exists, which is as long as shoes 30 are rotating at a different angular velocity than housing 26. Re-engagement of the friction surfaces for the purpose of effecting a power transmission between hubs 22 and 24 is not achieved until there is no relative rotation between said members. Under normal operating conditions, in order to effect re-engagement between the frictional surfaces so as to make possible a further power transmission from the driven to the driving members, it is necessary to bring said members to rest or to completely unload the driven member so that the drag of the lubricating film 46 is sufficient to bring the latter member to the speed of the driving member. To facilitate the circulation of lubricant in housing 26 each of shoes 30 may be provided with a plurality of circumferential openings 48.

Figure 5:
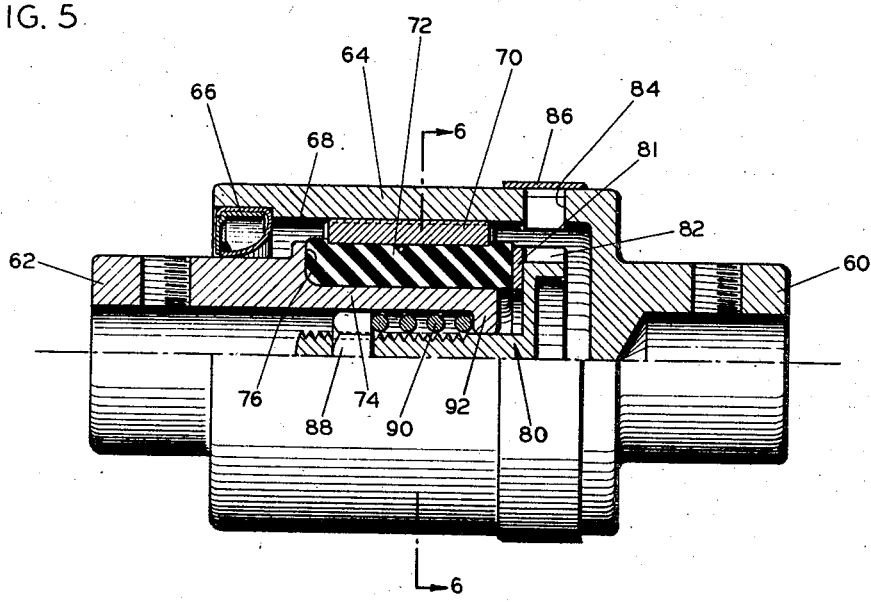
Fig. 5 is a view, partly in section and partly in elevation, of a modified embodiment of the invention.
Figure 6:
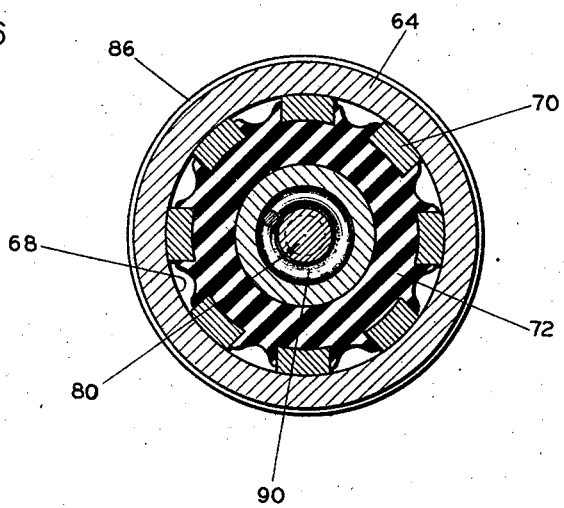
Fig. 6 is a sectional view taken substantially along line 6—6 of Fig. 5.

A modification of the coupling wherein there is embodied novel means for mounting the friction shoes and novel means for controlling the pressure normally urging said shoes into operative frictional engagement is shown in Figs. 5 and 6. In the form illustrated, the coupling comprises substantially coaxial hubs 60 and 62 and a housing 64 integrally formed, for example, with hub 60, a fluid seal 66 being preferably provided between the open end of said housing and hub 62 for rendering the interior of said housing fluidtight. Inner surface 68 of said housing constitutes one of the friction surfaces of the coupling and is adapted to be engaged by a plurality of friction shoes 70 which are preferably molded with, or otherwise directly secured to, a sleeve 72 of yieldable material, such as a synthetic rubber. Sleeve 72 is, in turn, fixedly mounted on a hollow extension 74 of hub 62, as by being molded therewith, said extension having a shoulder 76 which the inner end of said sleeve abuts. A preferred method for forming the assembly comprising extension member 74, sleeve 72 and shoe 70, is by molding the same as a unit in a single operation.

The outer end of sleeve 72 projects beyond the end of extension 74 and in order to vary the radial pressure which is exerted by said sleeve on shoes 70 to urge the latter into frictional engagement with surface 68, novel axially adjustable means are provided for applying a compressive force to said projecting end of said sleeve. In the form shown, said means comprise a screw member 80 having a circular head so located opposite the end of sleeve 72 as to exert axial pressure on said sleeve, preferably through a washer 81 which may be secured to said sleeve, as by being molded therewith. Teeth 82 are preferably formed on the periphery of the head of screw 80 to provide a means for rotating said screw, as for example, by tool means inserted through an opening 84 in housing 64. In order to maintain said housing fluid-tight, said opening is normally closed by means of a sleeve member 86 mounted on the exterior of said housing.

The shank of screw member 80 extends within extension member 74 and is threaded into a nut 88, which is held against rotation by the walls of said extension member. Suitable resilient means, such as a coil spring 90, is interposed between, and is normally held under compression by, nut 88 and an internally extending flange 92 formed at the end of extension member 74. It will be apparent that said spring biases screw member 80 in a direction which causes the head of said screw member to apply a predetermined axial compressive force to sleeve 72, said force being a function of the axial position of nut 88. Accordingly, screw member 80 provides a ready means for varying the force normally urging shoe 70 into engagement with surface 68 and thereby provides a ready control of the maximum torque transmittable by the coupling.

During operation of the coupling, yieldable sleeve 72 permits limited universal movement of shoes 70 relative to hub 62 and thereby provides a means for compensating for misalignments of the coupled shafts. It also tends to prevent the transmission of shocks, vibrations and power fluctuations from one shaft to the other and by providing a lubricant within housing 64, it is possible to effect substantially complete disengagement of the friction surfaces whenever there is relative movement between shoes 70 and surface 68. As a result, when the maximum torque which can be transmitted by the coupling is exceeded, shoes 70 are substantially completely disengaged from surface 68 until such time as there is no relative rotation between the coupled members.

It is to be understood that shoes 70 may be formed of the same material as sleeve 72 so as to be integral therewith. In the latter event, it may be desirable to harden or coat the outer surface layer of said shoes by differential vulcanization or a conventional coating process.

Figure 7:
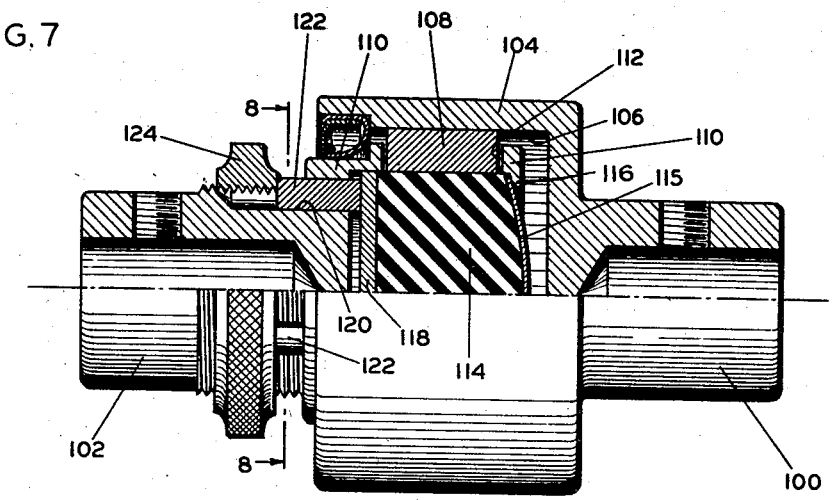
Fig. 7 is a view similar to Fig. 5 of still another embodiment of the invention.
Figure 8:
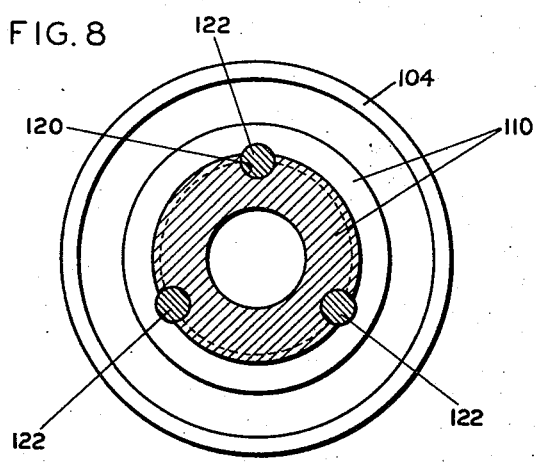
Fig. 8 is a sectional view taken substantially along line 8—8 of Fig. 7.

Still another embodiment of the invention is illustrated in Figs. 7 and 8 and comprises a pair of coaxial hubs 100 and 102 and a housing 104 formed with hub 100 and providing a friction surface 106, which is adapted to be frictionally engaged by a plurality of shoes 108. In order to operatively mount each of said shoes in the same way as the shoes of the embodiment of Figs. 1 to 4 are mounted, a cage 110 is preferably integrally formed with hub 102 and is provided with a plurality of slots or openings 112 for receiving said shoes. The latter are preferably of the same shape as shoes 30 and the walls of openings 112 bear the same relation to said shoes as do the openings shown in Fig. 4. A core 114 of neoprene, or other yieldable material, is contained within said cage and is held therein, for example, by a retaining member 115 which, in turn, is held as by peening over the end portion 116 of said cage or by forming, or securing, an internal flange on said end portion. Core 114 engages the inner surfaces of shoes 108 to yieldably press the latter with a predetermined force in the direction of surface 106 and provides a yieldable mounting for said shoes which permits limited universal movement thereof whereby the coupling may function in the transmission of torque between two shafts in a similar manner to the previously described embodiments.

In order to vary the force applied by core 114 to shoes 108 and thereby control the maximum torque which can be transmitted by the coupling, novel means are provided and, as shown, said means comprise a disc or plate 118 mounted within cage 112 so as to be free for axial movement and engaging the inner face of said core. A plurality of openings 120 are provided in hub 102 adjacent the periphery of said hub and extend within cage 112, said openings serving to slidably mount a plurality of pins 122. Each of said pins has one end thereof within said cage and in engagement with said disc and the other end in engagement with a nut member 124 threadedly mounted on the exterior of hub 102, the latter being externally threaded to receive said nut. Rotation of said nut member causes axial movement of pins 122 and effects a corresponding axial change in the position of disc 118, thereby varying the compression of core 114 and controlling the force applied by said core to shoes 108 in the direction of surface 106.

Figure 9:
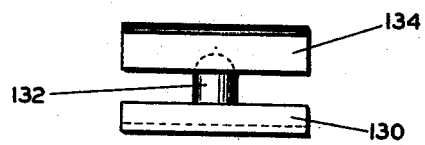
Fig. 9 is a view in elevation of novel shoe means which may be substituted for the shoes of each of the above couplings.

In all of the above described embodiments the friction shoes comprise a unitary element which is mounted so as to be directly engaged by the yieldable pressure-applying member. It is to be expressly understood, however, that in each of said embodiments there may be substituted for each of said friction shoes, shoe means as shown in Fig. 9 comprising a base member 130, provided with a pin 132 on which shoe 134 is mounted for rotary and pivotal movement. Base member 130 may be mounted in the coupling in the same way as any of shoes 30, 70 and 108 of Figs. 1, 5 and 7, respectively, except that in the embodiments of Figs. 1 and 7 no circumferential clearance is necessary between the walls of the openings in the cages and the side walls of said base member. As a result of this arrangement, shoes 134 are free for limited universal movement as are the shoes of the other embodiments but tilting or pivotal movement of said shoes produces no deformation of the yieldable pressure-applying member.

There is thus provided a novel torque-transmitting device useful particularly as a coupling and embodying novel means for mounting friction members for operative engagement with one another, and novel means for automatically effecting substantially complete disengagement of said members when a predetermined torque is exceeded. There is also provided novel means for controlling the frictional engagement between the friction members so as to vary the maximum torque which can be transmitted. The novel coupling is also effective to absorb shocks, vibrations and power fluctuations, thereby minimizing the transmission of these undesirable forces between the coupled members.

Since certain changes in the constructions set forth which embody the invention may be made without departing from its scope, it is intended that all matter contained in the above description, or shown in the accompanying drawings, shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a device for transmitting torque from a rotary driving member to a rotary driven member, means connected to one of said members providing a friction surface, means connected to the other of said members for frictionally engaging said surface, said last-named means comprising a plurality of friction shoes, a cage having a plurality of openings for receiving said shoes, a member of yieldable material contained in said cage and engaging said shoes to bias the latter in the direction of said surface, and axially movable means comprising a plurality of pins for varying the compressive force applied to said yieldable material to vary the force normally exerted by said material upon said shoes.

2. In a device for transmitting torque from a rotary driving member to a rotary driven member, means connected to one of said members providing a friction surface, means connected to the other of said members for frictionally engaging said surface, said last-named means comprising a plurality of friction shoes, a cage having a plurality of openings for receiving said shoes, a member of yieldable material contained in said cage and engaging said shoes to bias the latter in the direction of said surface, and axially movable means comprising a screw member extending through said member of yieldable material for varying the compressive force applied to said yieldable material to vary the force normally exerted by said material upon said shoes.

3. In a device for transmitting torque from a rotary driving member to a rotary driven member, means connected to one of said members providing a friction surface, means connected to the other of said members for frictionally engaging said surface, said last-named means comprising a plurality of friction shoes, a member of yieldable material urging said shoes into operative engagement with said surface, and resilient means for predeterminedly controlling the force normally exerted by said yieldable member upon said shoes.

4. In a device for transmitting torque from a rotary driving member to a rotary driven member, means connected to one of said members providing a friction surface, means connected to the other of said members for frictionally engaging said surface, said last-named means comprising a plurality of friction shoes, a member of yieldable material under axial compression adapted to apply a radial pressure to each of said shoes to urge the latter into operative engagement with said surface, and means including a spring for controlling the axial compression of said yieldable member.

5. In a device for transmitting torque from a rotary driving member to a rotary driven member, means connected to one of said members providing a friction surface, means connected to the other of said members for frictionally engaging said surface, said last-named means comprising a plurality of friction shoes and a continuous, annular member substantially concentric to said friction surface consisting of a fixed mass of yieldable, rubber-like material, said annular member being free of said friction surface and being held within said device under axial compression and transmitting a radial pressure to each of said shoes to urge the latter into operative engagement with said friction surface, and means comprising an axially movable member in engagement with one end of said annular member for varying the compression of said annular member without changing its mass to control the radial pressure exerted thereby upon said shoes.

6. In a device for transmitting torque from a rotary driving member to a rotary driven member, means connected to one of said members providing a friction surface, means connected to the other of said members for frictionally engaging said surface, said last-named means comprising a plurality of friction shoes, a member consisting of a fixed mass of rubber-like, yieldable material substantially solid and homogeneous throughout its volume, said member being free of said friction surface and held under axial compression in order to apply a radial pressure to each of said shoes to urge the latter into operative engagement with said friction surface, means for varying the axial compression of said yieldable member to control the radial pressure exerted thereby upon said shoes, said last-named means comprising an axially-movable member, and means accessible from the exterior of said device for adjusting the axial position of said last-named member.

7. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, and means for so mounting said shoes that said lubricant substantially completely disengages said shoes from said surface whenever there is relative rotation between said shoes and said surface, said last-named means comprising yieldable material free of said shoe-engaging surface for applying pressure to urge each of said shoes into operative engagement with said surface, said yieldable material comprising a solid, continuous, annular mass substantially concentric to said friction surface and being held under axial compression in order to transmit radial pressure to said shoes.

8. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, and means for so mounting said shoes that said lubricant substantially completely disengages said shoes from said surface whenever there is relative rotation between said shoes and said surface, said last-named means mounting each of said shoes for limited universal movement and including a unitary pressure-applying member of yieldable material, said pressure-applying member providing at least a solid, continuous, annular mass substantially concentric to said friction surface, said mass being held under axial compression in order to transmit radial pressure to each of said shoes.

9. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, means for so mounting said shoes that said lubricant substantially completely disengages said shoes from said surface whenever there is relative rotation between said shoes and said surface, said last-named means comprising a member of rubber-like, yieldable material under axial compression adapted to apply a radial pressure to each of said shoes to urge the latter into operative engagement with said surface, and means for varying the axial compression of said yieldable member to control the radial pressure exerted by said yieldable member upon said shoes, said last-named means comprising an axially movable member and means accessible from the exterior of said device for adjusting the axial position of the latter member.

10. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, means for so mounting said shoes that said lubricant substantially completely disengages said shoes from said surface whenever there is relative rotation between said shoes and said surface, said last-named means comprising a cage having a plurality of openings for receiving said shoes, a member of yieldable material contained in said cage and engaging said shoes to bias the latter in the direction of said surface, and axially movable means for varying the compressive force applied to said yieldable material to vary the force normally exerted by said material upon said shoes.

11. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, means for so mounting said shoes that said lubricant substantially completely disengages said shoes from said surface whenever there is relative rotation between said shoes and said surface, said last-named means comprising a cage having a plurality of openings for receiving said shoes, a member of yieldable material contained in said cage and engaging said shoes to bias the latter in the direction of said surface, and axially movable means comprising a screw member extending through said member of yieldable material for varying the compressive force applied to said yieldable material to vary the force normally exerted by said material upon said shoes.

12. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, and means for so mounting said shoes that said lubricant substantially completely disengages said shoes from said surface whenever there is relative rotation between said shoes and said surface, said last-named means comprising a yieldable member consisting of a rubber-like, oil-resistant material for applying pressure to urge each of said shoes into operative engagement with said surface, said yieldable member comprising a solid, continuous, annular mass of said material substantially concentric to said friction surface.

13. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, and means for so mounting said shoes that said lubricant substantially completely disengages said shoes from said surface whenever there is relative rotation between said shoes and said surface, said last-named means mounting each of said shoes for limited universal movement and including a yieldable member consisting of a rubber-like, oil-resistant material, said yieldable member comprising a solid, continuous, annular mass of said material substantially concentric to said friction surface.

14. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, means for so mounting said shoes that said lubricant substantially completely disengages said shoes from said surface whenever there is relative rotation between said shoes and said surface, said last-named means comprising a member of yieldable material to urge said shoes into operative engagement with said surface, and resilient means for predeterminedly controlling the force normally exerted by said yieldable member upon said shoes.

15. In a device for transmitting torque from a rotary driving member to a rotary driven member, means connected to one of said members providing a friction surface, means connected to the other of said members comprising a plurality of friction shoes for operatively engaging said surface, said means cooperating with one another to provide a fluid-tight housing, said housing containing a lubricant accessible to said shoes and said surface, means for so mounting said shoes that said lubricant substantially completely disengages said shoes from said surface whenever there is relative rotation between said shoes and said surface, said last-named means comprising a member of yieldable material under axial compression adapted to apply a radial pressure to each of said shoes to urge the latter into operative engagement with said surface, and means including a spring for controlling the axial compression of said yieldable member.

16. In a device for transmitting torque from one member to another member, means connected to one of said members providing a friction surface, and means connected to the other of said members comprising a plurality of friction shoes and mechanism for mounting said shoes for operatively engaging said surface, said means cooperating with one another to provide a housing, said housing containing a lubricant accessible to said shoes and said surface, said mechanism for mounting said shoes comprising a cage having therein a plurality of openings for receiving said shoes, said openings being of such size as to permit appreciable pivotal movement of said shoes therein, and a member of yieldable material at least partially confined within said cage and formed at least in part of a rubber, said yieldable member being held under compression and applying a force to said shoes urging the same into contact with said shoe-engaging surface, said yieldable member permitting appreciable pivotal movement of said shoes whereby, upon relative movement between said shoes and said shoe-engaging surface, a substantially complete disengagement between said shoes and said surface is obtained.

17. In a device for transmitting torque from one member to another member, means connected to one of said members providing a friction surface, and means connected to the other of said members comprising a plurality of friction shoes and mechanism for mounting said shoes for operatively engaging said surface, said means cooperating with one another to provide a housing, said housing containing a lubricant accessible to said shoes and said surface, said mechanism for mounting said shoes comprising a member of yieldable material at least partially confined in said housing and held therein under compression, said member exerting a force upon said shoes in a direction urging the same into contact with said shoe-engaging surface and being formed at least in part of a rubber, said shoes being bonded to said rubber, said yieldable member providing a mounting for said shoes permitting appreciable pivotal movement thereof whereby said shoes are adapted to be substantially completely disengaged from said shoe-engaging surface by said lubricant upon relative movement of said shoes with respect to said surface.

18. In a device for transmitting torque from one member to another member, means connected to one of said members providing a friction surface, means connected to the other of said members comprising a plurality of friction shoes for operatively engaging said surface, said means cooperating with one another to provide a housing, said housing containing a lubricant accessible to said shoes and said surface, and means for so mounting said shoes that said lubricant disengages said shoes from said surface whenever there is relative rotation between said shoes and said surface, said last-named means mounting each of said shoes for pivotal movement and including a yieldable member formed at least in part of rubber and comprising at least an annular portion of said rubber substantially concentric to said friction surface, said yieldable member being held under compression in said housing and applying a force to said shoes urging the same into contact with said shoe-engaging surface.

19. In a device for transmitting torque from one member to another member, means connected to one of said members providing a friction surface, means connected to the other of said members comprising a plurality of friction shoes for operatively engaging said surface, said means cooperating with one another to provide a housing, said housing containing a lubricant accessible to said shoes and said surface, means for so mounting said shoes that said lubricant disengages said shoes from said surface whenever there is relative rotation between said shoes and said surface, said last-named means mounting each of said shoes for pivotal movement and including a yieldable member formed at least in part of rubber and comprising at least an annular portion of said rubber substantially concentric to said friction surface, said yieldable member being held under compression in said housing and applying a force to said shoes urging the same into contact with said shoe-engaging surface, and means comprising a member movable with respect to said yieldable member for predeterminedly controlling the compression of said yieldable member to control the force normally exerted by said yieldable member upon said shoes.

OTTO E. WOLFF.

REFERENCES CITED

The following references are of record in the file of this patent:

UNITED STATES PATENTS

| Number | Name | Date |
| --- | --- | --- |
| 122,818 | Ebbitt | Jan. 16, 1872 |
| 950,290 | Hughes | Feb. 22, 1910 |
| 1,482,402 | Lamb | Feb. 5, 1924 |
| 1,690,543 | Linderman | Nov. 6, 1928 |
| 2,179,837 | Wolkoff | Nov. 14, 1939 |
| 2,251,445 | Fawick | Aug. 5, 1941 |
| 2,263,599 | Tucker | Nov. 25, 1941 |
| 2,288,859 | Valentine | July 7, 1942 |

FOREIGN PATENTS

| Number | Country | Date |
| --- | --- | --- |
| 20,650 | Great Britain | 1911 |
| 143,096 | Switzerland | 1930 |
| 372,406 | Great Britain | 1932 |
| 534,161 | Germany | 1931 |